US008944192B2

(12) United States Patent
Nance et al.

(10) Patent No.: US 8,944,192 B2
(45) Date of Patent: Feb. 3, 2015

(54) ROBOTIC PLATFORM FOR TRAVELING ON VERTICAL PIPING NETWORK

(75) Inventors: Thomas A. Nance, Aiken, SC (US);
Nick J. Vrettos, Augusta, GA (US);
Daniel Krementz, Augusta, GA (US);
Athneal D. Marzolf, Martinez, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 0 days.

(21) Appl. No.: 13/260,884

(22) PCT Filed: Apr. 20, 2011

(86) PCT No.: PCT/US2011/000715
§ 371 (c)(1),
(2), (4) Date: Sep. 28, 2011

(87) PCT Pub. No.: WO2011/133221
PCT Pub. Date: Oct. 27, 2011

(65) Prior Publication Data
US 2013/0025947 A1    Jan. 31, 2013

Related U.S. Application Data

(60) Provisional application No. 61/342,828, filed on Apr. 20, 2010.

(51) Int. Cl.
*B62D 57/024* (2006.01)
*F22B 37/00* (2006.01)

(52) U.S. Cl.
CPC ............ *B62D 57/024* (2013.01); *F22B 37/005* (2013.01)
USPC .......................................................... 180/7.1

(58) Field of Classification Search
USPC .................................................... 180/8.5, 8.7
See application file for complete search history.

(56) References Cited

U.S. PATENT DOCUMENTS

| | | | |
|---|---|---|---|
| 4,345,658 A * | 8/1982 | Danel et al. .................... | 180/8.5 |
| 4,449,599 A | 5/1984 | Creek | |
| 4,893,512 A | 1/1990 | Tanimoto et al. | |
| 6,821,071 B2 | 11/2004 | Woolslayer et al. | |
| 7,036,202 B2 | 5/2006 | Lorenz | |
| 7,055,594 B1 | 6/2006 | Springett et al. | |
| 7,314,343 B2 | 1/2008 | Hawkins et al. | |
| 7,452,196 B2 | 11/2008 | Khoshnevis | |
| 7,533,715 B1 | 5/2009 | Klahn et al. | |
| 7,665,530 B2 | 2/2010 | Wells et al. | |
| 2005/0135902 A1 | 6/2005 | Spisak | |
| 2010/0187740 A1 | 7/2010 | Orgeron | |
| 2011/0100734 A1* | 5/2011 | Fauroux et al. ................ | 180/8.7 |

FOREIGN PATENT DOCUMENTS

| | | |
|---|---|---|
| EP | 0 084 867 | 8/1983 |
| JP | 63 219490 | 9/1988 |

OTHER PUBLICATIONS

International Search Report, PCT/US2011/000715, Savannah River Nuclear Solutions, LLC, Oct. 18, 2011.

* cited by examiner

*Primary Examiner* — Tony Winner
(74) *Attorney, Agent, or Firm* — Bennett Mullinax LLC

(57) ABSTRACT

This invention relates generally to robotic systems and is specifically designed for a robotic system that can navigate vertical pipes within a waste tank or similar environment. The robotic system allows a process for sampling, cleaning, inspecting and removing waste around vertical pipes by supplying a robotic platform that uses the vertical pipes to support and navigate the platform above waste material contained in the tank.

7 Claims, 5 Drawing Sheets

ROBOTIC PLATFORM FOR TRAVELING ON VERTICAL PIPING NETWORK

RELATED APPLICATION

This application claims the benefit of International Application Serial No. PCT/US2011/000715, filed on Apr. 20, 2011, entitled "Robotic Platform for Traveling on Vertical Piping Network" and which is incorporated herein by reference. This application also claims the benefit of U.S. Application Ser. No. 61/342,828, filed on Apr. 20, 2010, entitled "Robotic Platform for Traveling on Vertical Piping Networks" and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention relates generally to robotic systems and is specifically designed for a robotic system that can navigate vertical pipes within a waste tank or similar environment. The robotic system allows a process for sampling, cleaning, inspecting and removing waste around vertical pipes by supplying a robotic platform that uses the vertical pipes to support and navigate the platform above waste material contained in the tank.

BACKGROUND OF THE INVENTION

Chemical and radioactive waste tanks may have hundreds of vertical cooling pipes positioned within the waste tanks. Each pipe is an obstacle that can cause interference with spray washing, tank sampling, inspection and the positioning and navigation of waste removal equipment. For monitoring purposes, it is necessary to be able to sample, clean, and remove waste associated with the vertical cooling pipes. While a number of robotic systems are known in the art, there remains room for variation and improvement.

Accordingly, there remains room for improvement and variation within the art.

SUMMARY OF THE INVENTION

It is an aspect of at least one embodiment of the present invention to provide for a robotic platform that can selectively engage vertical pipes for support and allow movement from one vertical pipe to another vertical pipe so as to allow travel within the environment which occupies the vertical pipes.

It is a further aspect of at least one embodiment of the present invention to provide for a robotic platform having an extendable arm which allows the robotic platform to engage vertical pipes which do not have a uniform basing.

It is another aspect of at least one embodiment of the present invention to provide for a robotic platform having at least one gripper which allows the gripper to rotate about a vertical pipe while maintaining a position relative to a longitudinal access of the vertical pipe.

It is a further aspect of at least one embodiment of the present to provide for a gripper having at least one drive roller configured therein such that the rotational drive roller provides a rotating force such that the robotic platform can rotate about a vertical pipe and to facilitate the alignment of an open gripper on the robotic platform with a nearby second vertical pipe.

It is a further aspect of at least one embodiment of the present invention to provide for a gripper assembly having pneumatic actuators to extend and retract the gripper as needed in order to engage or disengage from a pipe.

It is a further aspect of at least one embodiment of the present invention to provide for pressure sensors mounted in at least one of the grippers to allow for control of the amount of gripping force applied to a vertical pipe by the gripper.

It is a further aspect of at least one embodiment of the present invention to provide for a robotic platform having an upper pair of grippers and a lower pair of grippers such that the upper pair and lower pair of grippers can move or engage in a tandem arrangement, thereby providing greater security and payload support for the robotic platform.

It is a further aspect of at least one embodiment of the present invention to provide for a pipe alignment and distance measuring system such as a laser and/or camera to determine a pipe center and proper alignment prior to actuating a pipe gripper.

It is a further aspect of at least one embodiment of the present invention to provide for a robotic platform for navigating a vertical array of pipes comprising a first horizontal arm having a pipe gripper positioned on each terminal end of the first horizontal arm; a second horizontal arm having a pipe gripper positioned on each terminal end of the second horizontal arm, said second horizontal arm carried below said first arm and each of the first arm and the second arm responsive to a corresponding pneumatic cylinder where a length of the first arm and a length of the second arm may be varied; a first drive roller responsive to a first drive roller motor, the first drive roller positioned along the first side of the robotic platform, a second drive roller responsive to a second drive roller motor and positioned along a second side of the robotic platform, each of the first and the second drive rollers operatively dispose to engage a surface of a pipe secured within corresponding grippers, an engaging force between the respective drive roller and the respective pipe being controlled by a drive roller pneumatic cylinder.

The robotic platform may have a first horizontal arm and the second horizontal arm which are further connected by a first cross member and a second cross member, each of the first and the second cross members having an adjustable length. Each of said pipe grippers may further define a plurality of rollers, the rollers adapted for rotational movement within a gripper relative to a pipe secured within the gripper.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
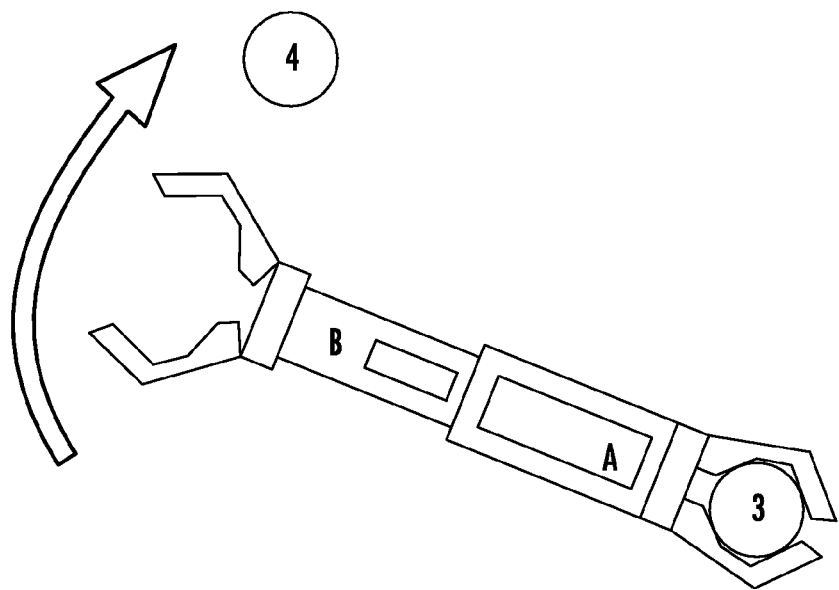
FIG. 1 is a schematic view showing the steps of gripping and extension of a robotic platform relative to vertical support pipes.
Figure 1:
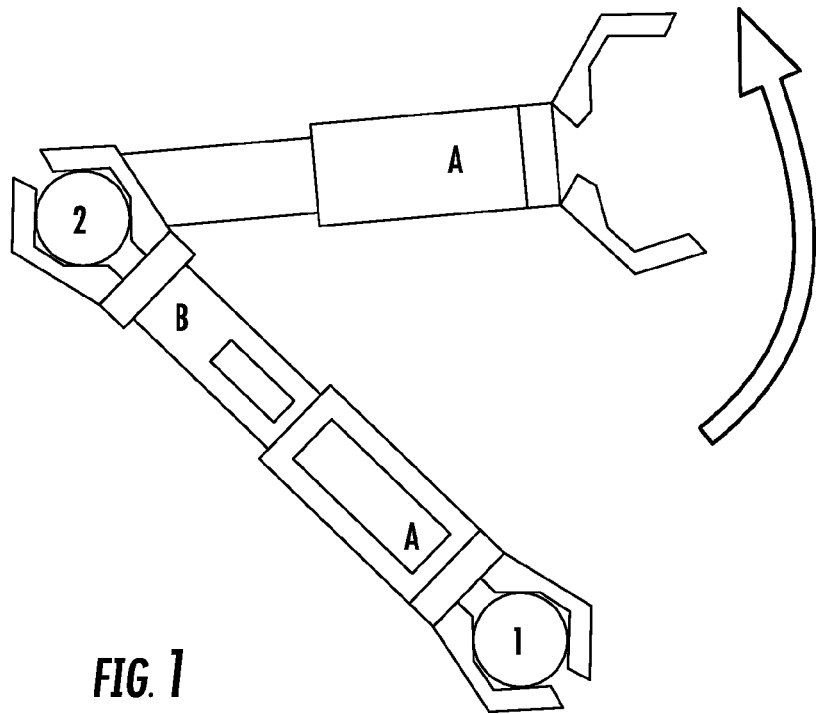

FIG. 1 is a schematic view of a robotic platform showing the ability for the group of arms to pivot and vary the length of the platform as the robotic platform moves from vertical pipe 1 to 2 to 3 to 4. Movement is enabled by a variety of roller grippers having appropriate drive units as well as a pneumatic arm for extending and retracting the slideable portions of the pneumatic arm. In addition to pneumatic actuators, further gripper means of carrying out the relative movement including screw actuators and an electrical linear slide may also be used. As is better seen in reference to FIGS. 2 and 3, the roller grippers have a roller gripper motor, a gripper base plate, gripper fingers, finger rollers and gripper sensors. The roller gripper drive further includes a drive motor, a drive wheel, a drive pneumatic cylinder, and a mounting plate.

Figure 2:
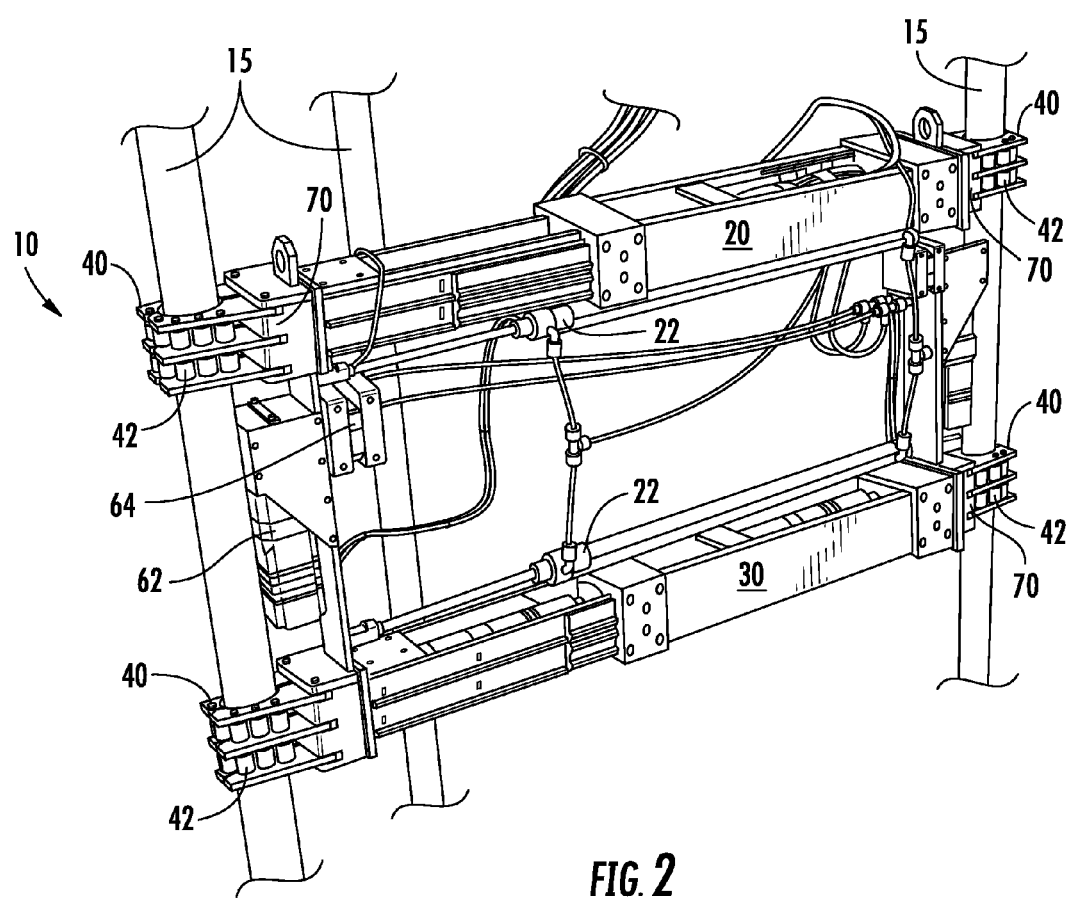
FIG. 2 is a perspective view of a robotic platform in relation to a series of vertical support pipes.
Figure 3:
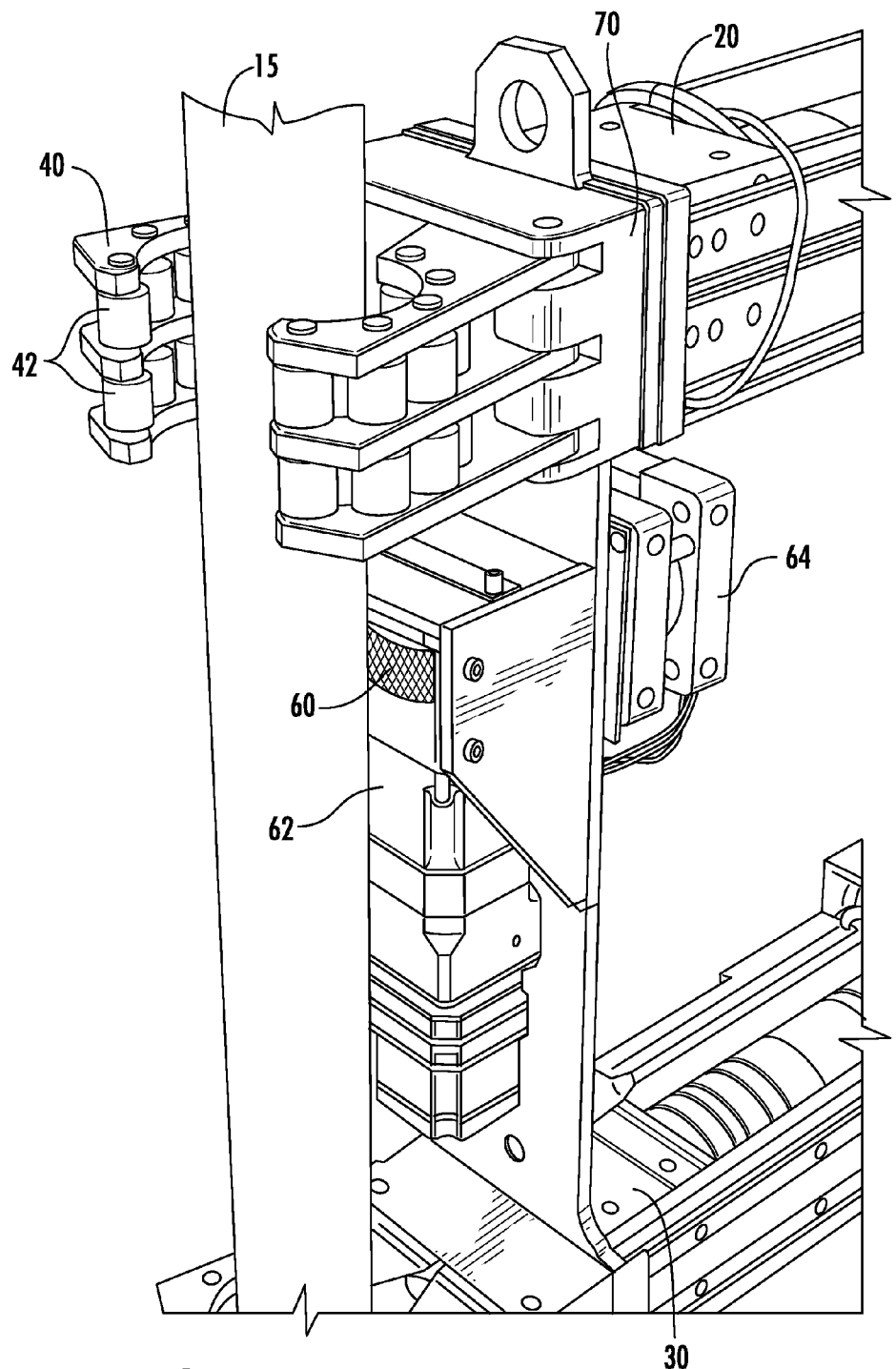
FIG. 3 is a close-up of an engagement arm of the robotic platform showing additional details of the gripper mechanism relative to a vertical pipe.
Figure 4:
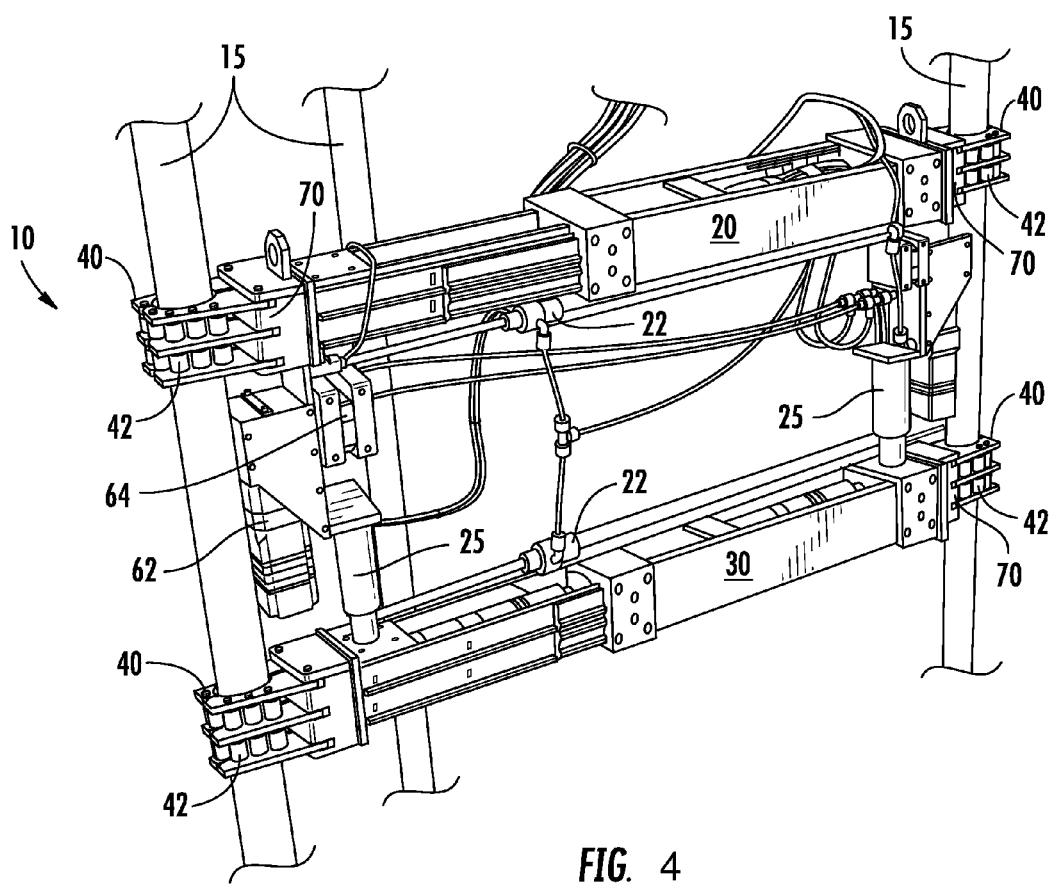
FIGS. 4 and 5 set forth additional details of the robotic platform.
Figure 5:
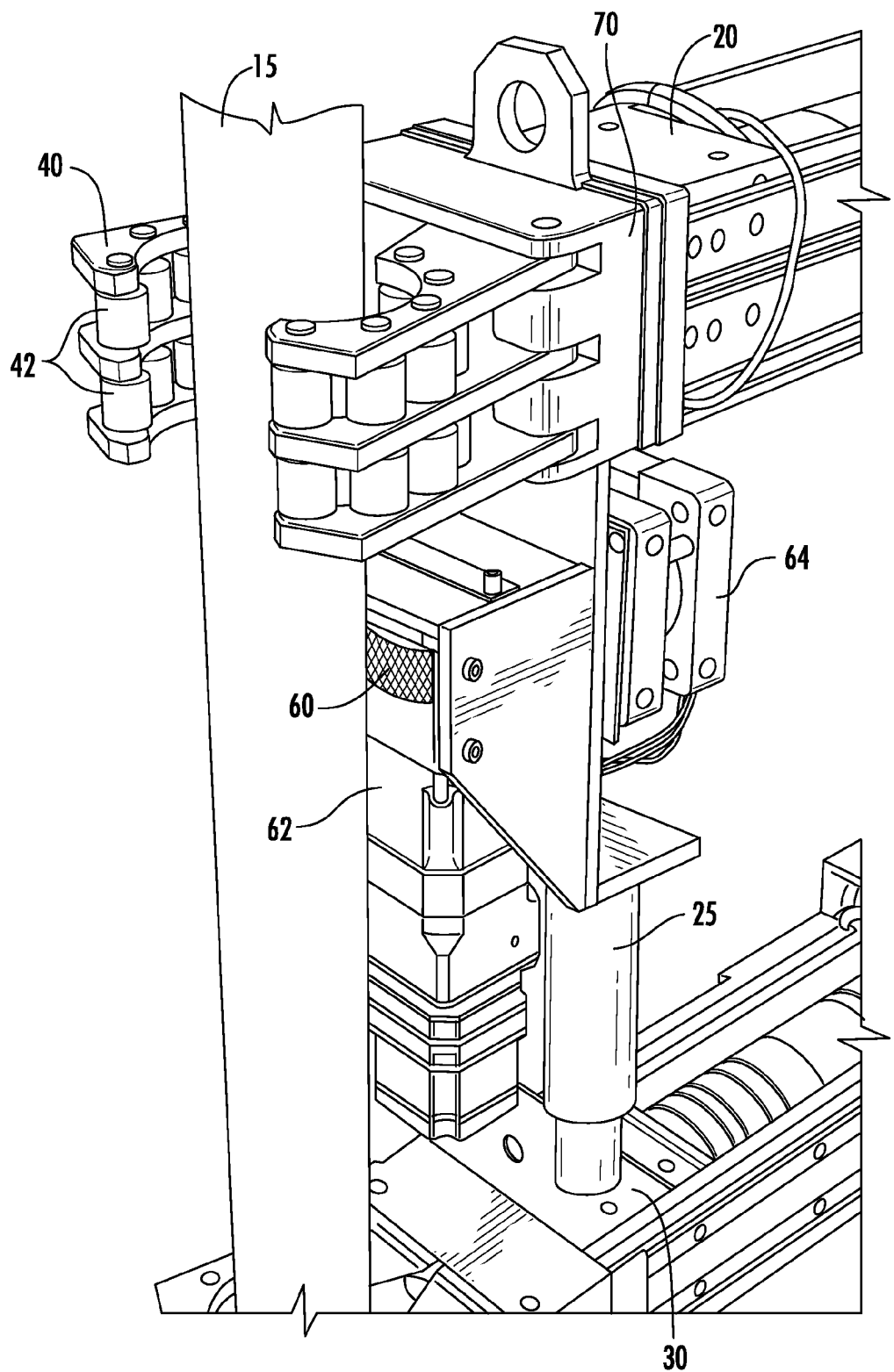

A robotic platform 10 for navigating across a plurality of vertical pipes 15 is seen in reference to FIGS. 2 and 3. The platform 10 comprises an upper horizontal arm 20 and a lower horizontal arm 30. Both upper and lower arms 20 and 30 can extend and retract the length of the arm via a pneumatic cylinder 22. The extension of arms 20 and 30 in the illustrated embodiment are designed to operate in tandem such that the length of arms 20 and 30 extends and retracts together.

At a terminal end of each arm 20 and 30 are a respective pair of motor controlled grippers 40. Grippers 40 are responsive to an electronic motor which allows the pivoting motion of each gripper 40 to provide an engaged/closed position about a pipe 15 to an open position (FIG. 3). From an open position, gripper 40 may be extended/retracted from pipe 15 by operation of the pneumatic cylinders 22.

As further seen in reference to FIGS. 2 and 3, each gripper 40 further defines a plurality of elastomeric rollers 42. Rollers 42 may be positioned in stacked rows and are adapted to engage the surface of the pipe 15 when gripper 40 is in closed position. A motor 70 is associated with each gripper 40 and is used to open and close the gripper 40. Appropriate sensors may be employed that allow an operator to regulate the force applied by the gripper 40 to pipe 15. The amount of force can be varied depending upon the weight of a pay load which might be attached to the platform 10. Further, the gripper force can also be varied as needed to allow for rotation of the platform as described below.

Positioned on either side of platform 10 and between upper arms 20 and lower arms 30 are a pair of drive rollers 60. Each drive roller 60 is responsive to an electric motor 62 which can turn the drive roller in a clock-wise or counter clock-wise direction. Further, each drive roller is in operative communication with a pneumatic cylinder 64 that can vary the position of the drive roller 60 relative to an adjacent pipe surface as well as control the amount of force applied between the drive roller 60 and pipe 15.

Drive rollers 16 can be provided from a variety of materials. It has been found that an elastomeric material such as rubber on the surface of the drive wheel can be used though metal drive rollers may also be employed. In accordance with this invention, it has been found that a proper degree of force needs to be supplied by the pneumatic cylinder 64 so as to position the drive roller 60 with sufficient tension against an adjacent pipe surface. If too little force is applied, the drive roller will spin but not cause rotation of the robotic platform 10. If too much force is applied, the pipe 15 may be pressed within gripper 40 by flexing of the pipe such that rotational movement will not occur.

In reference to the orientation seen in FIG. 2, the drive roller 60 on the left side of the robotic platform 10 can engage the surface of pipe 15 by positioning the drive roll 60 against pipe 15 by operation of the pneumatic cylinder associated with the drive roller 60. By controlling the gripping force of the grippers 40 on the left side of the robotic platform, the drive roller 60 may engage the pipe and pivot the robotic platform along the left side when the right side grippers 40 are fully disengaged and retracted from the associated pipe 15. In this fashion, the robotic platform can be positioned so that the right side is subsequently aligned with an additional pipe 15. By the appropriate extension and retraction of arms 20 and 30, the right side of the platform can engage an additional pipe 15. The process can repeat itself by selected movement of the right and left side of the robotic platform 10 by pivoting along a plurality of pipes 15 thereby allowing the robotic platform to horizontally traverse a pipe field.

Robotic platform 10 can be utilized to transport cargo, equipment, or provide for cleaning apparatuses or inspection equipment to be deployed within the pipe fields. The pressure of the gripper 40 may be varied in keeping with the weight of the payload and may be further adjusted drum rotational movements to facilitate pivoting a platform along an engaged pipe 15. While not separately illustrated, video cameras and laser positioning systems may be employed on a robotic platform to assist a remote operator in visualizing proper alignment and engagement of the robotic platform components within the pipe field.

The embodiment illustrated in FIGS. 2 and 3 allow for adjustment of the length of horizontal arms 20 and 30. Similar pneumatic cylinders 25 and retractable arms can be used with pivotable platform 10 to allow for vertical extension and movement of the platform components. In this manner, the platform can be moved in a step-wise fashion up or down the pipe field by securing one of the arms 20 or 30 to a pipe while the adjacent arm is disengaged and either lifted or lowered. By alternating the engagement arms and vertical motion, the robotic platform may be raised and lowered. The robotic platform therefore has the ability to navigate both vertically and horizontally a pipe field thereby providing a vehicle to carry out inspections, cleaning, and the transport of cargo throughout the pipe field.

One having ordinary skill in the art would recognize it for a variety of various gripping apparatuses, drive motors, drive units, pressure sensors and control mechanisms that can be used to construct the robotic platform according to the motivation and descriptions set forth herein.

With respect to gripping and related technology, reference is made to U.S. Pat. No. 7,314,343 entitled "Miniature Manipulator for Servicing the Interiors of Nuclear Steam Generator Tubes" and which is incorporated herein by reference. Additional patents showing various forms of pipe gripping mechanisms, actuators, rotational grips and engageable fingers can be seen in reference to U.S. Pat. No. 7,055,594 entitled "Pipe Gripper and Top Drive Systems"; U.S. Pat. No. 7,452,196 entitled "Automated Plumbing Wiring and Reinforcement"; U.S. Pat. No. 6,821,071 entitled "Automated Pipe Wrapping Process and Apparatus"; U.S. Pat. No. 7,533,715 entitled "Tube Walker for Examination in Pair of Steam Generators"; U.S. Pat. No. 4,449,599 entitled "Finger Walker for Tube Sheet"; U.S. Pat. No. 7,036,202 entitled "Apparatus and Method for Handling of Tubulars"; U.S. Pat. No. 7,665,530 entitled "Tubular Grippers and Top Drive Systems; US Published Application 20100187740 entitled "Pipe Gripping Apparatus"; and US Published Application 20050135902 entitled "Pipe Transfer Apparatus", the above cited references all being incorporated herein by reference.

As seen from the accompanying figures, the robotic platform provides an ability to remotely control the four individual gripper motors and the two rotation motors of a platform. The controls also provide for a variable 0-24 VDC voltage output to all motors for speed control. An appropriate interface between the robotic platform and a laptop computer may be provided. Where appropriate, amplifier transducers may be used in line with the gripper load cells to convert the load cell voltage to a 4-20 mA loop current to minimize electrical noise. The 4-20 mA signal may be connected to the analog input module to permit remote measurement of the gripper force. Relay output modules can be used to provide control signals for actuation of the pipe travel grippers.

The remotely controlled robotic platform may be controlled by appropriate software which provides a user interface for actuating the pipe travel grippers and locational motors. Feedback signals from the gripper load cells are monitored during the closing of the gripper to stop the actuation at a preset load value. The preset load value may be determined to ensure adequate gripping force in the pipe and to maintain the pipe travel position. Excessive gripping may interfere with rotational motors designed to rotate the robotic platform relative to a pipe access. Insufficient gripping force may cause unwanted movement along the vertical axis of the pipe.

Momentary contact of virtual switches may be used to open and close the grippers with the gripper forcing the adjustable between about 0 to about 1000 pounds of force. Once a gripper set is selected, an operator may either select to open or close the gripper using the virtual momentary contact switches. When the operator selects to close the pipe traveler gripper around the pipe, the gripper will close until the operator either releases the momentary switch or the gripper force limit has been obtained. Rotational direction of either pipe traveler arm is provided through the actuation of momentary rocker switches. Once the pipe traveler arm is rotated in alignment with the next pipe, to be gripped the pipe traveler is extended using pneumatic control valves until the gripper is in contact with the pipe. The operator may then actuate the gripper to close until the gripper force limit is reached. Photograph, video and visual readouts of the force for each gripper may be displayed on a display panel.

The robotic platform described above would be used to deliver pay loads of sampling equipment, introduce spray nozzles, pumping equipment, inspection equipment, or equipment for in situ testing of materials including radiological analysis equipment. The robotic platform may be used to provide installation and removal of equipment by navigating the plurality of vertical pipes within a waste tank environment.

The robotic platform described above has an ability to climb and descend on a network of pipes. Climbing may be accomplished by the steps of: (1) releasing the grip of the top gripper(s) on the vertical pipe(s) by maintaining the grip of the lower gripper(s); (2) extending pneumatic cylinders between the lower and upper grippers to raise the upper gripper(s) upward along the pipe(s); (3) gripping the raised position of the pipe(s) by the upper gripper(s); (4) releasing the grip of the roller gripper(s) from the pipe(s); (5) retracting the pneumatic cylinders between the upper and lower gripper(s) causing the lower gripper(s) to be lifted along the vertical pipe(s) to a raised position on the pipe(s); and (6) gripping the new raised position on the vertical pipe(s). Descending along the network of pipes would be accomplished by carrying out the steps above in the opposite order.

An additional feature of the robotic platform is the ability to move a payload that may be supported on the robotic framework. For instance, a payload such as a spray nozzle, sampling system, camera, gamma detector, or similar instrument may initially be supported within a center of a robotic framework. If desired, the payload may be transferred along the robotic platform during movement of the platform from pipe to pipe. At times, it may be desirable to move the payload weight to a position above the engaged grippers while the other grippers are not engaged and extended to the next pipe. By maintaining the payload along the side of the robotic platform which is actively engaging the pipe 15 permits the best distribution of the cargo weight relative to the robotic platform. If the weight of the cargo is positioned too far laterally from an engaged pipe, the weight distribution can cause a binding of the pipe within the gripper 40 which may interfere with the desired navigation through the pipe field. After engagement of the next pipe, the payload can be transferred across the robotic frame above the now engaged gripper prior to the first grippers being released for pivoting to the next pipe. Such a transfer of cargo can be conducted using any suitable pneumatic or motorized conveyance.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention. In addition, it should be understood that aspects of the various embodiments may be interchanged, both in whole, or in part. Therefore, the spirit and scope of the invention should not be limited to the description of the preferred versions contained therein.

That which is claimed:

1. A method of using a robotic platform to climb a network of pipes comprising the steps of:
   releasing a grip of an upper roller gripper on a vertical pipe and maintaining a grip of a lower roller gripper;
   extending pneumatic cylinders between the lower and the upper roller grippers to raise the upper gripper along the pipe;
   gripping a new position of the pipe by the upper roller gripper;
   releasing the grip of the lower roller gripper from the pipe;
   retracting the pneumatic cylinders between the upper and lower roller gripper causing the lower roller gripper to be lifted along the vertical pipe to a raised position on the pipe;

gripping a new position on the vertical pipe(s) using the lower gripper; and pivoting the robotic platform relative to a vertical pipe by use of a drive roller engaging a surface of the vertical pipe when one of the upper roller groups or lower roller groups is disengaged from the vertical pipe.

2. The method according to claim 1 comprising the additional step of:

varying a distance between the engaged gripper and the disengaged gripper; and moving the disengaged gripper to a new location along a second vertical pipe.

3. The method according to claim 2, wherein a payload carried by the robotic platform is positioned in proximity to the engaged grippers prior to the rotating step.

4. A method moving a payload on a robotic framework over a series of vertical pipes comprising the steps of:

releasing a grip of a pair of upper roller grippers on the vertical pipes while maintaining a grip of a pair of lower roller grippers on the respective first and second vertical pipes;

extending a pneumatic cylinder between the lower and upper grippers to raise the upper gripper along the vertical pipe;

gripping a new position of the pipe by the upper pair of grippers;

releasing the grip of the pair of lower grippers from the pipe;

retracting the pneumatic cylinders between the upper and lower pair of grippers causing the lower grippers to be lifted along the vertical pipe(s) to a raised position on the pipes; and gripping a new raised position on the vertical pipe using the lower pair of grippers.

5. The method according to claim 4 comprising the additional steps of:

releasing the grip of the grippers on one side of a robotic platform;

retracting the released grippers from an associated pipe;

rotating the robotic platform relative to an engaged pipe.

6. The method according to claim 5 comprising the additional step of positioning a payload carried by the robotic platform in proximity to an engaged pipe prior to rotating the robotic platform.

7. A method of using a robotic platform to navigate a network of pipes comprising the steps of supplying a robotic platform comprising a first horizontal arm having a pipe gripper positioned on each terminal end of the first horizontal arm;

a second horizontal arm having a pipe gripper positioned on each terminal end of the second horizontal arm, said second horizontal arm carried below said first arm and each of the first arm and the second arm responsive to a corresponding pneumatic cylinder where a length of the first arm and a length of the second arm may be varied;

a first drive roller responsive to a first drive roller motor, the first drive roller positioned along the first side of the robotic platform, a second drive roller responsive to a second drive roller motor and positioned along a second side of the robotic platform, each of the first and the second drive rollers operatively dispose to engage a surface of respective first and second pipes secured within the corresponding grippers, an engaging force between the respective drive roller and the respective pipe being controlled by a drive roller pneumatic cylinder;

releasing a grip of an upper roller top gripper on a vertical pipe and maintaining a grip of a lower roller gripper;

extending pneumatic cylinders between the lower and the upper roller grippers to raise the upper gripper along the pipe;

gripping a new position of the pipe by the upper roller gripper;

releasing the grip of the lower roller gripper from the pipe;

retracting the pneumatic cylinders between the upper and lower roller gripper causing the lower roller gripper to be lifted along the vertical pipe to a raised position on the pipe; and gripping a new position on the vertical pipe using the lower gripper.

\* \* \* \* \*